United States Patent [19]

Sheesley et al.

[11] 4,143,505

[45] Mar. 13, 1979

[54] COLLECTION AND RECYCLING APPARATUS FOR CROP MATERIAL PARTICLES IN A ROLL FORMING MACHINE

[75] Inventors: Donald L. Sheesley; Edward T. Eggers, both of New Holland; Willis R. Campbell, Ephrata, all of Pa.

[73] Assignee: Sperry Rand Corporation, New Holland, Pa.

[21] Appl. No.: 847,993

[22] Filed: Nov. 2, 1977

[51] Int. Cl.² .......................................... A01D 39/00
[52] U.S. Cl. ...................................... 56/341; 100/88
[58] Field of Search .................... 56/341, 343; 100/88, 100/76

[56] References Cited

U.S. PATENT DOCUMENTS 4,009,653  3/1977  Sacht .................................. 56/341

Primary Examiner—Jay N. Eskovitz
Attorney, Agent, or Firm—Ralph D'Alessandro; Frank A. Seemar; Frank A. Seemar

[57] ABSTRACT

Apparatus in a crop roll forming machine for improving the core formation of the crop rolls and for collecting particles of crop material lost from either the crop package or loose crop material during the roll formation process consisting of an elongated tailgate with a collection pan. The particles are recycled from the collection pan back into the roll forming region by the cooperative interaction of the tailgate collection pan and the upper bale forming means as the bale forming means traverses a predetermined path imparting rotative motion to the crop material delivered to the roll forming region.

12 Claims, 3 Drawing Figures

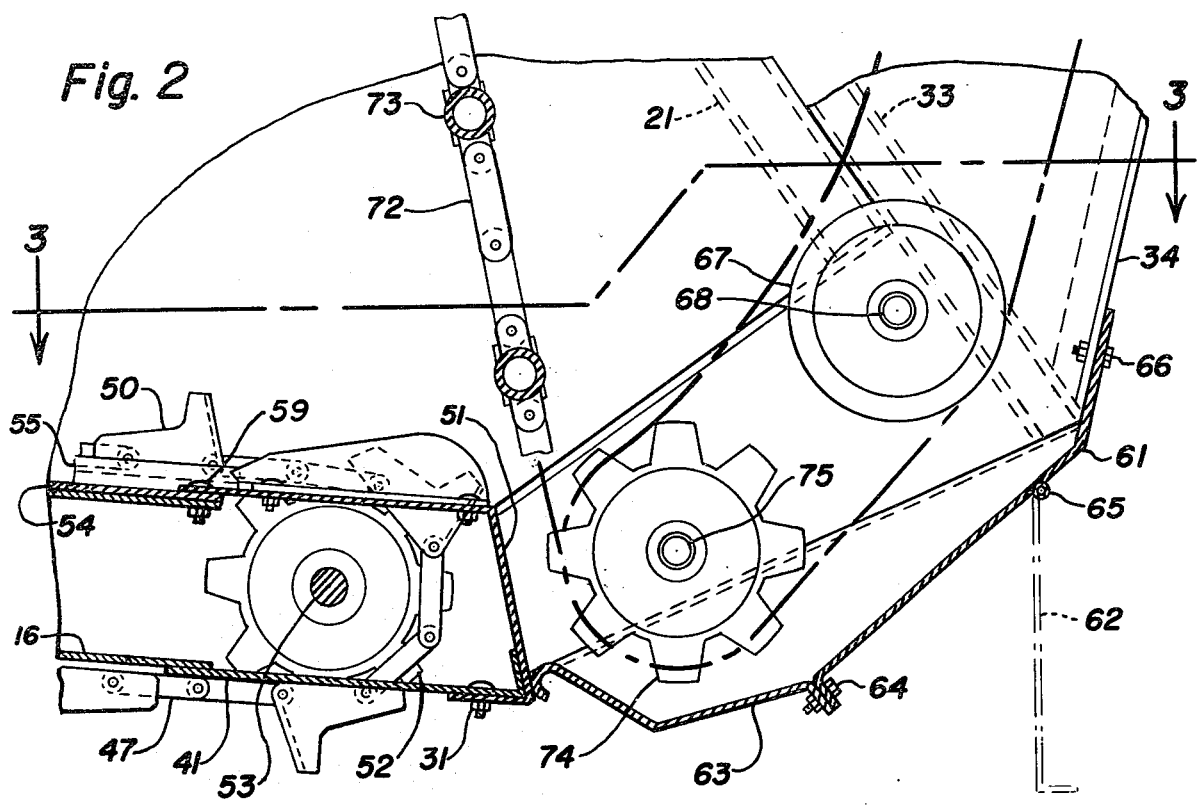
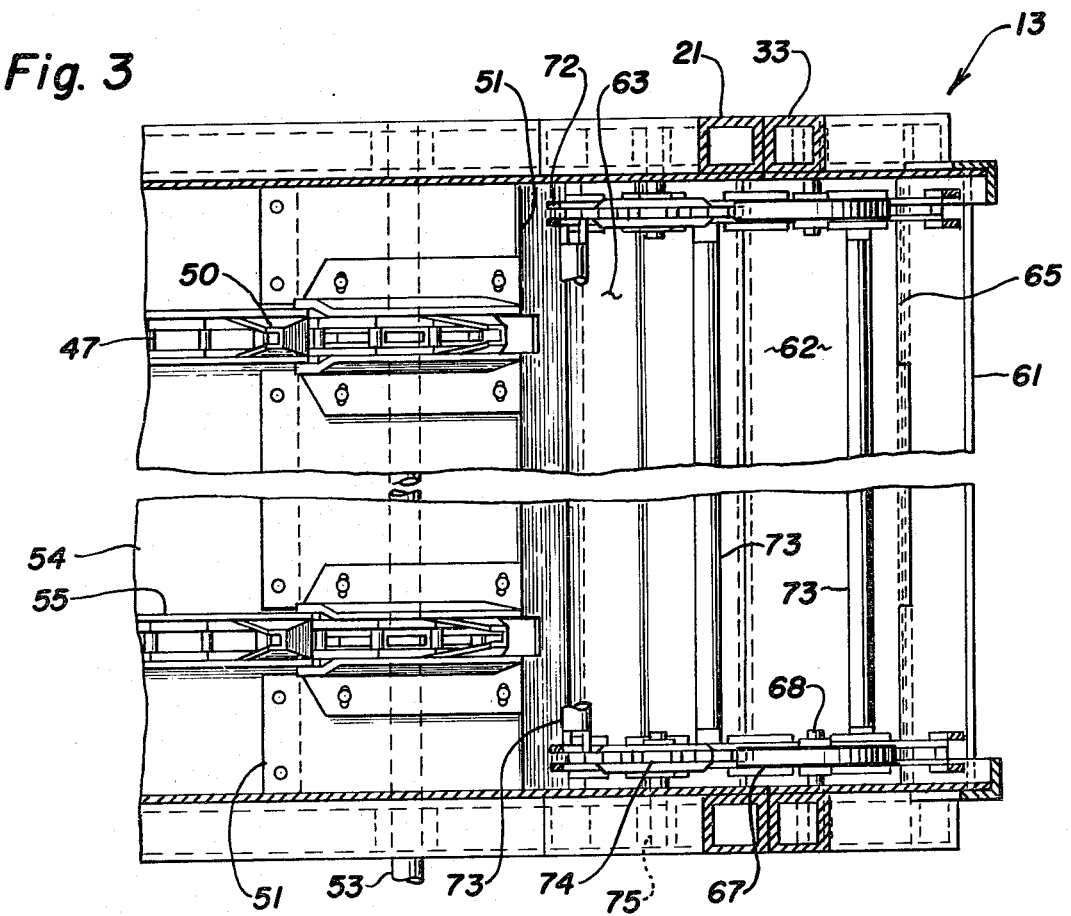

COLLECTION AND RECYCLING APPARATUS FOR CROP MATERIAL PARTICLES IN A ROLL FORMING MACHINE

BACKGROUND OF THE INVENTION

This invention is concerned primarily with crop roll forming machines. Specifically it is concerned with such apparatus which improve the core formation of crop material rolls and collect crop material particles lost from the crop package or loose crop material during the roll formation process and recycle those particles back into the roll forming region for inclusion within the completed roll package.

Historically it has been the custom to harvest forage crops by moving the crops, letting them dry in the field, forming the dried crop material into windows and passing a hay-baling machine over and along those windrows to form the crop material into rectangular bales. Recent practice has shown that the formation of crop materials into large compact rolls, rather than rectangular bales as formerly done, permitted the crop material to be deposited in roll form and left in fields for extended periods of time since the rolled material tends to provide a self-shedding protective covering from inclement weather. The ability to leave these rolled bales in fields thus obviated the additional steps of gathering the rectangular bales and transporting them to a storage area protected from the elements.

Several methods for forming compact rolls of crop material have evolved through the years. In one of these methods, a machine rolls a swath or windrow of crop material along the ground until a roll of desired size is obtained. Examples of machines utilizing this principle are shown in prior U.S. Pat. No. 3,110,145, dated Nov. 12, 1963. Another similar machine comprises the subject matter of prior U.S. Pat. No. 3,650,100, dated Mar. 21, 1972. One of the principal difficulties in using this method of forming rolls of crop material is that a certain amount of the material remains upon the ground without being included in the roll. Furthermore, dirt, clods of earth, stones and the like can also be picked up by the roll and included therein. This is undesirable under certain circumstances.

A later, and more successful, method of forming crop rolls comprises a machine in which a swath or windrow of material is picked up from the field and directed onto a lower conveyor. This conveyor transports the material to a roll forming region where an upper apron or flight of belts, usually positioned above and adjacent the conveyor, moves in a suitable direction to rotate the crop material with which it contacts. It has been a continuing problem for this type of roll forming machine to obtain an easily started compact roll core. Similarly, the loss of crop particles from this type of machine has been a lingering concern. Variations of this type of crop roll forming machine are illustrated in U.S. Pat. No. 3,859,909 to Mast, dated Jan. 14, 1975 and U.S. Pat. No. 3,722,197 dated Mar. 27, 1973. An improvement of the former type of machine as shown in prior U.S. Pat. No. 3,866,531 to Todd, dated Feb. 18, 1975, attempted to solve these problems through the use of leaf springs.

The increasing popularity of crop roll forming machines has seen their use broaden from rolling wintering forage for livestock to rolling high protein crops, such as alfalfa, for dairy livestock where the amount of crop material loss is critical. In this latter area especially, interest in the amount of high nutrient crop material lost during roll formation has intensified.

Additionally, crop roll forming machines have been used in a wider range of crop materials, thus presenting varying core formation problems peculiar to each type of crop. Roll forming machines of the type taught in Todd with leaf springs have proven extremely effective in virtually all types of crops. However, minor difficulties have been experienced with some crops that are short and extremely dry and brittle. Since the leaf springs are motionless they occasionally form a dead area where these extremely short, dry, and brittle crops accumulate since the crops are too brittle to withstand being raised through the vertical distance required for them to come to contact with the live, motion-imparting bale forming means. Such brittle crops occasionally will continue to build up until the roll forming machine becomes less efficient. A similar core forming problem can occur in this type of machine when used in loosely packed, low windrows. Such conditions will delay the formation of a core for the rolled crop material since there will be insufficient crop material being fed by the pickup means onto the floor and transported back to the leaf springs to be forced up and over the leaf springs into contact with the live bale forming means. Crop material, in this instance, will remain on the leaf springs until sufficient quantities of material are fed back to force the material up and over the leaf springs into contact with the bale forming means.

The foregoing problems are solved in the design of the machine comprising the present invention by substantially decreasing the amount of crop material lost during the roll formation process and by allowing the usage of the roll forming machine in a wider range of crops, such as corn, maize stubs and hay, with improved core formation.

SUMMARY OF THE INVENTION

It is the principal object of the present invention to provide an improved crop roll forming machine that will collect crop material particles lost from the crop package or loose crop material during the roll formation process and recycle those particles back into the roll forming region for inclusion in the completed roll package.

It is another object of the present invention to provide an improved crop roll forming machine that will have a better roll core formation capability, thereby allowing its usage in a wider range of crop materials.

It is another object of the invention to provide an improved crop roll forming machine that will form a compact roll core while operating in a field with varying size and varying density windrows.

These and other objects and advantages are obtained by providing an apparatus in a crop roll forming machine for improving the core formation of the crop rolls and for collecting particles of crop material lost from either the crop package or loose crop material during the roll formation process comprising an elongated tailgate with a collection pan. The particles are recycled from the collection pan back into the roll forming region by the cooperative interaction of the tailgate collection pan and the upper bale forming means as the bale forming means traverses a predetermined path imparting rotative motion to the crop material delivered to the roll forming region.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 2 is a side elevation of a section of the lower apron and the elongated tailgate of a roll forming machine in the roll forming configuration; and FIG. 3 is a top plan view of the lower apron in the elongated tailgate in a roll forming machine.

DETAILED DESCRIPTION

Figure 1:
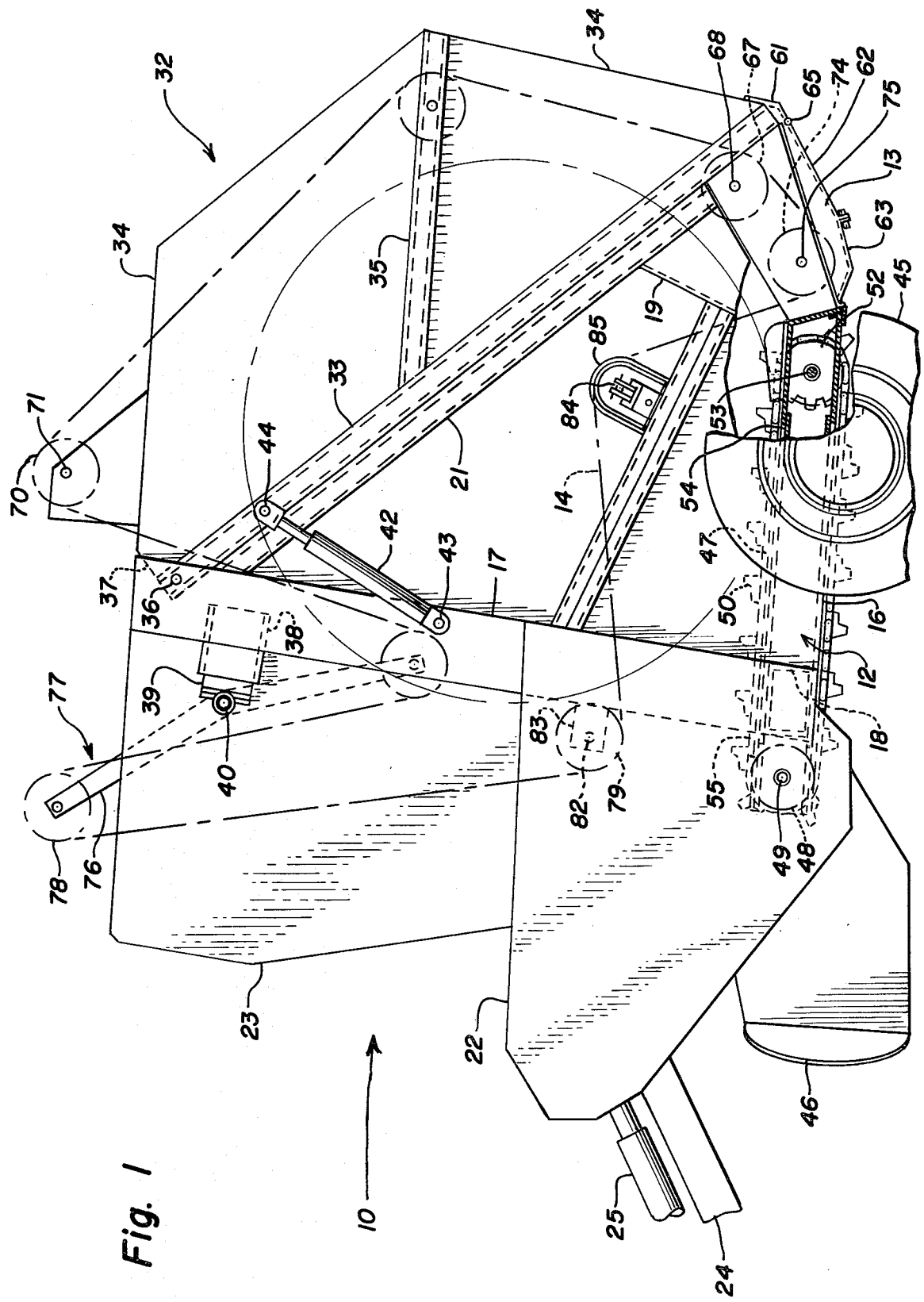
FIG. 1 is a partially diagrammatic side elevation of a roll forming machine illustrating the function of the elongated tailgate in association with the lower and upper aprons.

Briefly, FIG. 1 depicts a general representation of the roll forming machine 10 with a detailed cutaway of the cooperative functioning of the elongated tailgate 13, the bale forming means comprising the upper apron 14, and the conveying means comprising the lower apron 15. Machine 10 comprises a base frame 12 which has similar side arrangements of structural members fixedly connected together, such as by welding. Each side of the frame comprises a bottom horizontal member 16, with the forward end of the frame connected to a vertical member 17 of substantial height. Extending perpendicularly to the junction of members 16 and 17 is a cross member 18, the adjacent end of which is fixedly connected to the junction of member 16 to 17. A short member 19 extends upwardly from the rear portion of horizontal member 16, the upper end of this member being connected to one end of an upwardly and forwardly extending angular brace member 21. This angular brace member is connected at its upper end to the upper portion of vertical member 17. Extending forwardly from the front face of member 17, but not shown, at each side of the machine is an A-frame consisting of angularly related members. These angular members are also not shown, being masked behind the side shield 22. Apron shields 23 are affixed to vertical member 17 above shield 22. Extending forwardly from this A-frame is a tractor hitch 24. Aligned along the same axis but above hitch 24 is drive shaft 25 attached at its forward end to a tractor power takeoff. The various frame members thusly described comprise the base frame 12, the towing hitch and drive shaft. They may be formed from heavy structural tubing, channels, or any other appropriate structural form commonly employed in framing of the type described.

The forward end of the machine in FIG. 1 has an appropriate gearbox, not shown, connected to suitable transverse supporting means and the angular members of the A-frame. The gearbox is driven by shaft 25 which is the primary source of operational power for the machine. A power output shaft, not shown, extends from the gearbox to one side of the machine as viewed in FIG. 1 to transfer power from the gearbox through a system of belted sheaves and drive sprockets to the operational elements.

An upper frame 32 is provided with side frames composed of straight frame members 33, the ends of which are connected to the opposite ends of an encasing frame member 34. A horizontal upper frame member 35 is fixedly fastened to frame member 33 and encasing frame member 34 at its opposing ends. The uppermost portion of each side frame member is pivotally connected at 36 to a suitable bearing fixed to the upper end of vertical frame member 17. Frame member 37 extends between the upper ends of straight frame member 33, thereby stabilizing the connection to the base frame 12 of the upper frame 32 at pivotal connection 36. The upper end of base frame 12 is further stabilized transversely by a bracing member 38 which extends between bearing brackets 39 which are connected to the front faces of the vertical frame members 17.

Upper frame 32 is moved from its lower, bale forming position as shown in FIG. 1 to its extended bale discharge position, not shown, by a pair of hydraulic cylinders 42. These hydraulic cylinders have their barrel ends 43 connected to vertical members 17 and their rod ends 44 connected to members 33 of upper frame 32. Suitable hydraulic lines, not shown are connected to opposite ends of cylinders 42 to simultaneously activate and control the operation of the upper frame.

The base frame 12 has a pair of wheels 45 (only one wheel of the pair being shown) connected thereto on opposite sides of the frame by an axle, not shown, to permit the roll forming machine to be drawn by a tractor or other suitable implement over a field for the purpose of forming rolls of crop material.

Extending forwardly from the front end of the base frame 12 is a pickup header 46, still referring to FIG. 1. This header is adapted to engage, elevate and rearwardly feed a swath or windrow of crop material onto the roll forming machine. The material engaged by the header passes rearwardly from the entrance end of lower apron 15 towards the rear of the machine. The lower apron 15 comprises a conveying means having a series of endless, flexible chains 47 see briefly FIG. 3, which are uniformly spaced transversely across the plane generally defined by the floor 54 of the roll forming machine. These endless, flexible chains 47 extend around driven sprockets 48 rotatably mounted on shaft 49 at the forward end of roll forming machine. The chains 47 also pass around idler sprockets 52 rotatably mounted at the rear of the machine about shaft 53. Mounted above the horizontal member 16 of base frame 12 is the floor 54 shown primarily in FIG. 2. Mounted to the floor by bolts 31 and partially encasing sprockets 52 is an angled cover plate 51 through which the chains 47 pass as they travel around sprockets 52. Angled bottom plate 41 is fastened to the bottom of horizontal member 16 in some suitable fashion such as welding or bolting. The floor is rigidly connected to frame 12 by a series of extending bars (not shown), the opposite ends of which are suitably connected to horizontal member of 16 of base frame 12 to support the floor in a generally horizontal position. The upper courses of chains 47 slide in channels 55 on floor 54, as shown briefly in FIG. 3. These channels are transversely spaced apart and suitably secured to floor 54 to support and guide the chains across the floor of the machine. The links of chains 47 have lugs 50 connected thereto. The upper courses of the chains 47 move in a direction toward the rear of the roll forming machine, so that the lugs 50 engage and direct crop material rearwardly across the floor portion of the machine.

The rear end of floor 54 abuts elongated tailgate 13 when the tailgate is in the closed, bale forming position, as shown in FIG. 2. The elongation in the tailgate is effected by a series of contiguous plates 61, 62 and 63. Plate 61, at the rearmost portion of the tailgate elongation, is affixed preferably by bolts 66, to encasing frame member 34. Plate 62 is hinged about hinge pin 65 at the front edge of plate 61. Hinge plate 62 is affixed, preferably by bolts 64, at its forwardmost point to plate 63. Alternatively, an adjustable plate could be affixed to either plate 63 or angled cover plate 51 to redress any inconsequential misalignments caused by manufacturing imprecisions to permit contiguous engagement of the lower tailgate and cover plate 51 when the tailgate is in the closed, bale forming position.

The upper apron 14 preferably comprises a pair of endless flexible link type chains 72 having, at longitudinally spaced intervals, bars 73 which extend between these chains the full width of the machine. The bars may be square or of any other suitable geometric shape.

The upper apron 14, as shown in FIG. 1, is supported and driven by various rollers and sprockets at each side of the upper frame 32. Guide rollers 67 are mounted about shaft 68 on opposing sides of the lower end of upper frame 32. Guide sprockets 70 and 74, respectively, are supported by clevises which are connected to the opposite ends of the encasing frame member 34. Sprockets 70 and 74 are mounted about shafts 71 and 75 respectively. Extending from the ends of shaft 40, which is supported in bearing brackets 39 adjacent the upper end of vertical frame member 17, is a pair of parallel arms 76. These arms comprise the expansion means 77 for the upper apron 14. The ends of these arms support rotatable guide sprockets 78 upon which the endless chains of upper apron 14 extend in the manner shown in FIG. 1. A tensioning means, not shown, operates to maintain the upper apron in contact with the roll of crop material as it is being formed so that a particular density of material can be obtained. Driving sprockets 79 are provided at each side of the base frame and are connected to a driven shaft 82 that is supported in bearing brackets 83 fixed relative to the base frame 12. The lower course of the upper apron 14 also slidably extends over the upper curved surface of retractably mounted auxiliary guide members 84, of the type described in detail in prior U.S. Pat. No. 3,815,345 dated June 11, 1974 to Mast. These auxiliary guide members 84 are spring loaded and are adapted to be retracted into accommodating spaces in the side plates of the machine so as not to interfere with the ends of the roll of material as the roll is being formed. Therefore, as the roll increases in diameter the auxiliary guide plates 84 will be pushed through openings 85 so as not to interfere with the ends of the roll as the roll increases in diameter.

In operation, as the roll forming machine is drawn over a field its pickup header 46 retrieves a swath or windrow of crop material from the field, elevating and transporting this material onto the floor 54 of the roll forming machine. This material is placed on the floor where the lugs 50 mounted on the flexible chains 47 transport the material from the front portion of the floor towards the rear. Thus a continuous stream of crop material is delivered to the floor of the machine and then is directed to the rearmost portion of this floor where it contacts the upper apron 14. The upper apron is rotating in a suitable direction, in combination with the direction of rotation of the lower apron chains, to cause the crop material to be rotated so as to form the material into a roll. The elongated tailgate 13 permits the guide sprockets 74 to be positioned lower to the ground. This lower positioning causes the upper apron 14, which passes about guide sprockets 74, to travel in a predetermined path toward auxiliary guide members 84 at an angle that is approximately 19 degrees from the vertical. Earlier machines of the type shown in prior U.S. Pat. No. 3,859,909, dated Jan. 14, 1975 to Mast, utilized a tailgate that was shorter and, therefore, was above the horizontal plane of the cover plate 51. This resulted in the predetermined path of the upper apron 14 having an angle approximately 45° from the vertical between guide sprockets 74 and auxiliary guide members 84. The steeper angle of ascent of the upper apron 14 during this portion of its travel in its predetermined path in the machine of the instant invention permits the crop material that is transported into contact with it by the lower apron chains to be more easily started in rotative motion in a wider range of crop materials. Consequently there is established a more compact and more easily formed core for the roll of crop material.

This procedure is continued, progressively increasing the diameter of the roll of material. During this roll forming cycle particles of crop material are lost either as the rolled crop material package is being formed or from the loose crop material being transported by the lower apron. The vast majority of these crop particles are lost at the rear of the cover plate 51. Prior roll forming machines permit some of these lost crop particles to escape through the slit formed by the junction of the rear end of the cover plate 51 and the bottom portion of the upper frame 32. Concurrently these crop particles would accumulate in the bottom of upper frame 32 until the crop roll was full sized and ready for ejection from the machine. At such times the upper frame 32 would be raised by the hydraulic cylinders 42 to allow the roll of crop material to be discharged from the rear of the machine. However, raising upper frame 32 would also cause the lost crop particles to be dumped from the upper frame onto the ground. The machine in the present invention directs these lost particles into a collection pan formed by its elongated tailgate 13 and actively returns them to the bale forming region formed between the upper and lower aprons. This is effected by the travel of the upper apron 14 passing about guide sprockets 74 in a clockwise direction toward auxiliary guide members 84. The lost crop particles are carried upward into contact with the rotating crop roll and are thus recovered for inclusion within the crop roll.

When the roll of crop material is finally formed and it is desired to discharge the formed roll from the machine, upper frame 32 is elevated through the use of hydraulic cylinders 42 and the lugs 50 mounted on the chains 47 of the lower apron positively engage the bottommost portion of the rolled crop material. This causes the roll of material to be moved rearwardly until it is urged off the roll forming machine. Once the bale has cleared the machine the upper frame 32 is lowered into the bale forming position, shown in FIG. 1.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangement of parts which will occur to one of skill in the art upon a reading of this disclosure.

Having thus described the invention, what is claimed is:

1. In combination with a roll forming machine for forming large round bales of crop material of the type having cooperating flexible endless upper and lower aprons driven in suitable directions to rotate the crop material into compact rolls within a roll forming region therebetween and a pivotally movable tailgate that is raised at completion of the roll forming cycle to allow the ejection of the roll, the improvement comprising:

an elongation of said tailgate at its lowest and rearmost point to form a collection pan for particles of crop material, said pan enclosing at least a portion of said endless upper apron such that the movement of said endless upper apron cooperatively functions with said pan to return the crop particles to said roll forming region for compressive inclusion in the crop roll.

2. A roll forming machine for crop material comprising:
(a) a mobile frame adapted to move across a field, said frame having a front end, two opposing sides, and a rear end;
(b) conveying means fixed to said frame, said conveying means having a front end, two opposing sides, and a rear end thereby defining a transport plane along which crop material is moved from said front end towards said rear end, said front end, opposing sides and rear end of said conveying means further being in substantial alignment with said front end, opposing sides and rear end of said frame;
(c) pickup means mounted to said frame adjacent said front end of said conveying means for engaging crop material and depositing it on said transport plane of said conveying means;
(d) bale forming means mounted to said frame substantially above said conveying means defining therebetween a bale forming region, said bale forming means including a movable motion-imparting curvilinear surface extending at least from a first location below said transport plane spaced from and behind said rear end of said conveying means to a second location above said transport plane;
(e) drive means operably connected to said bale forming means to impact motion thereto such that crop material delivered to the bale forming region by said conveying means is rotated to form a roll; and
(f) collection means supported on said frame adjacent said conveying means' rear end, said collection means positioned below said transport plane at least partially below said first location of said bale forming means and at least partially enclosing said bale forming means at said first location whereby crop material falling within said collection means is caused to move from said collection means to said transport plane by the motion of said bale forming means.

3. The roll forming machine according to claim 2 wherein said collection means further comprises an elongate open-topped, trough-like pan supported by said frame and extending substantially between said two opposing sides of said frame.

4. The roll forming machine according to claim 3 wherein said frame further includes upright support members mounted on said opposing sides of said frame, a tailgate mounted to said support members and at least partially enclosing said rear end of said frame, said elongate pan mounted on said tailgate, said tailgate further being pivotally affixed to said support members for movement in a generally upward arcuate path relative to said transport plane to allow ejection of the roll of crop material from the machine.

5. The roll forming machine according to claim 4 wherein said pan includes an access opening through one portion thereof having a cover plate hingedly affixed thereover, whereby selective access may be gained to said pan.

6. The machine according to claim 4 wherein said bale forming means further comprises an endless apron made of endless flexible chains interconnected by a plurality of cross members, said cross members embodying substantially rigid bars uniformly spaced apart and fastened to said flexible chains.

7. The roll forming machine according to claim 6 further including guide means mounted to said frame to position said apron endlessly between said first location below said transport plane and said second location above said transport plane and drive sprockets operably associated with said apron to impart motion thereto such that crop material delivered to the bale forming region by said conveying means is rotated to form a roll.

8. The roll forming machine according to claim 7 wherein said endless flexible chains are selectively supported on retractable cams as said chains extend upwardly between said first location to said second location at an angle less than 45° offset from an axis vertically taken through said first location.

9. The roll forming machine according to claim 7 wherein said endless flexible chains are selectively supported on retractable cams as said chains extend upwardly between said first location to said second location at an angle of approximately 19° offset from an axis vertically taken through said first location.

10. The roll forming machine according to claim 2 wherein said bale forming means further comprises an endless flexible belt movably supported on a plurality of rollers mounted to said frame.

11. The roll forming machine according to claim 2, wherein said bale forming means further comprises a plurality of endless flexible belts movably supported by a plurality of rollers mounted on said frame.

12. The roll forming machine according to claim 2 wherein said bale forming means further comprises a plurality of rotatable motion-imparting cylinders supported between said opposite sides of said frame.

* * * * *